United States Patent [19]

Yoshizawa et al.

[11] 4,323,999
[45] Apr. 6, 1982

[54] AUTOMATIC TRANSMISSION OR RECORDING OR TRANSMISSION AND RECEPTION CONTROL SYSTEM

[75] Inventors: Naomi Yoshizawa; Akira Terashima, both of Hatano, Japan

[73] Assignee: Pilot Mannenhitsu Kabushi Kaisha, Tokyo, Japan

[21] Appl. No.: 144,518

[22] Filed: Apr. 28, 1980

[30] Foreign Application Priority Data

Feb. 29, 1980 [JP] Japan .................. 55-24105

[51] Int. Cl.³ .......................................... G11B 15/00
[52] U.S. Cl. ................... 369/19; 179/1 SW; 179/1 VC; 179/1 HF; 179/107 BC; 179/107 E; 360/74.1; 455/100
[58] Field of Search ......... 179/107 BC, 1 HF, 100.11, 179/100.1 R, 100.1 VC, 15 W, 15 VC, 107 E; 455/100; 360/31, 71, 74.1; 369/19; 128/777

[56] References Cited

U.S. PATENT DOCUMENTS

| | | | |
|---|---|---|---|
| 2,255,250 | 9/1941 | Greiback | 179/107 BC |
| 3,067,289 | 12/1962 | Zimmermann | 179/6 R |
| 3,297,021 | 1/1967 | Davis | 340/189 M |
| 3,593,703 | 7/1971 | Gunn | 455/100 |
| 4,041,394 | 8/1977 | Pate | 455/100 |
| 4,188,549 | 2/1980 | Dorais | 179/1 VC |

FOREIGN PATENT DOCUMENTS

| | | | |
|---|---|---|---|
| 2511927 | 7/1976 | Fed. Rep. of Germany | 128/777 |
| 2621972 | 12/1977 | Fed. Rep. of Germany | 455/100 |
| 52-37421 | 3/1977 | Japan | 179/107 BC |

OTHER PUBLICATIONS

"Experimental Wide-Bandwidth Touch-Contact Microphone", by A. J. Brouns; J. Audio Eng. Soc., Jan., 1971, vol. 19, No. 1, pp. 41-45.

Primary Examiner—Bernard Konick
Assistant Examiner—Alan Faber
Attorney, Agent, or Firm—Jordan & Hamburg

[57] ABSTRACT

A system to automatically control the changeover of recording and recording stop, or transmission and transmission stop, and being employed in the recording or transmitting device provided with a vibration pick-up type microphone for picking up bone-conducted voice sounds. The automatic changeover of recording and recording stop or transmission and transmission stop is attained by control signals corresponding to impact vibrations except voice signals uttered by a microphone wearer himself, transmitted through his bones and picked up by the microphone or another controlling microphone.

13 Claims, 11 Drawing Figures

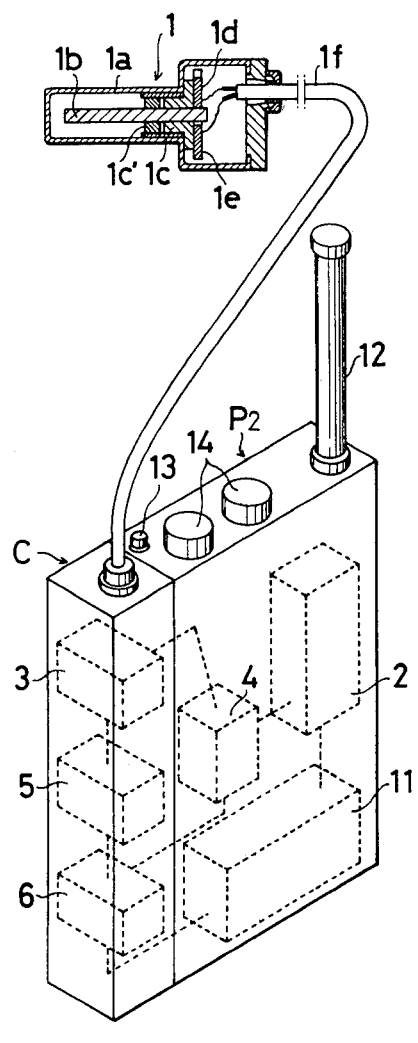
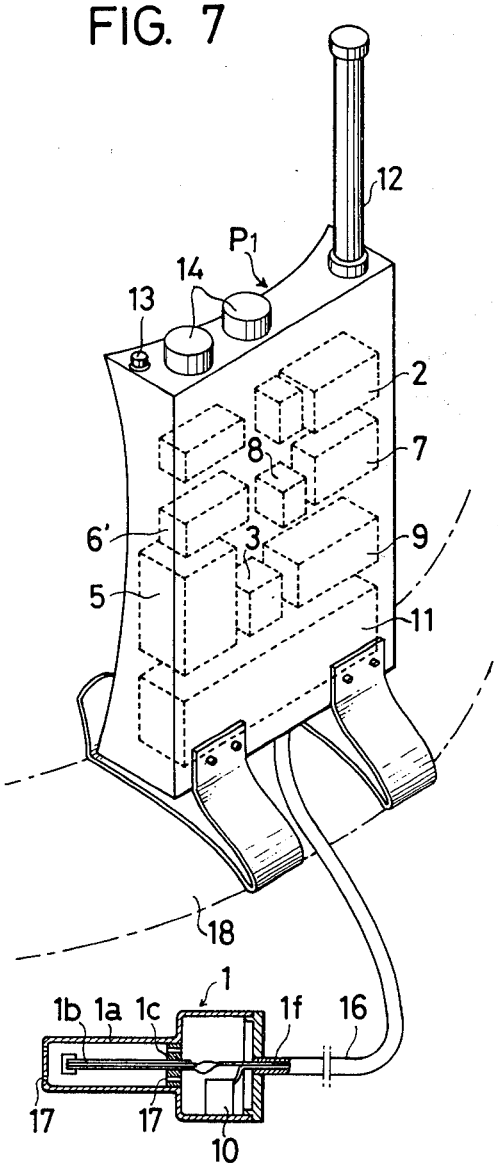
FIG. 6
FIG. 7

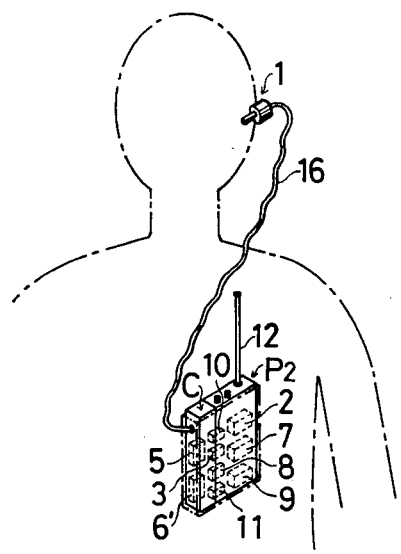
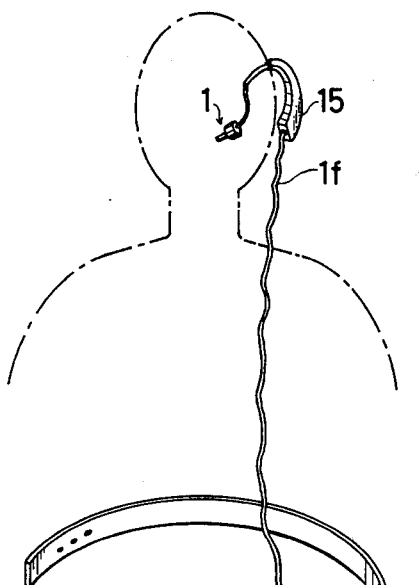
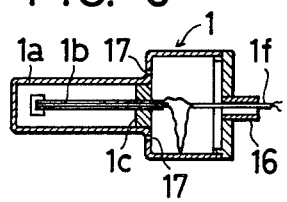
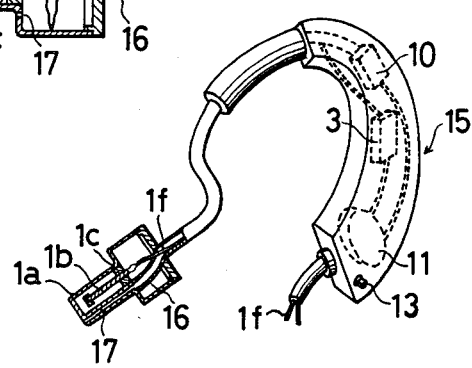

AUTOMATIC TRANSMISSION OR RECORDING OR TRANSMISSION AND RECEPTION CONTROL SYSTEM

The present invention relates to an automatic control system for use in the transmitter, recorder and transmitting and receiving device, said devices using a vibration pick-up type microphone and said system being employed so as to automatically control the changeover of transmission and transmission stop, recording and recording stop or transmission and reception. More particularly, the present invention relates to an automatic control system for automatically controlling, without malfunction, the changeover of transmission and transmission stop, recording and recording stop, or transmission and reception, using as control signals impact vibrations except for bone-conducted voice signals.

The vibration pick-up type microphone is well known to pick up bone-conducted voice signals (which will be hereinafter referred to as vibrations) transmitted to the external auditory canal wall, mastoid cells, forehead, throat and the like, and picked-up vibrations are applied as inputs to the conventional transmitting or recording device causing the device to perform wireless or wired transmission or recording. The conventional transmitting and receiving device is also well known to perform wireless or wired transmission and reception using the vibration pick-up type microphone and a speaker.

The transmitting and receiving device and the like using this vibration pick-up type microphone are characterized in that the microphone picks up vibration sounds well but not air-conducted sounds, and therefore most suitable for use under extremely noisy circumstances. In addition, the microphone is used attaching to the external auditory canal or the like, so that both hands of microphone wearing person are left free to do anything he wants at the time of transmission or the like.

As the technique of changing transmission to reception and vice versa in the wireless transmitting and receiving device such as the two-way radio to which is connected the vibration pick-up type microphone having the above-mentioned features and being combined with the speaker, are well known the press talk system using a manual switch and the voice controlled system capable of automatically attaining the changeover of transmission and reception responsive to outputs of microphone, that is, the automatic control system capable of automatically changing reception to transmission by talking voice signals and changing transmission to reception when no talking voice signal is present, using the voice controlled transmitter or the like. Further, the improved voice controlled system is also well known to automatically change transmission to reception and vice versa responsive to voice sounds by employing the voice frequency division system relative to outputs of speaker and microphone, and applying as inputs outputs of microphone to the voice controlled device.

However, these prior arts have the following drawbacks.

Firstly, the press talk system achieves the changeover of transmission and reception by the manual switch, so that at least one hand of the wearer is occupied in every changeover operation, thus making it impossible for the wearer to use his both hands at the time of transmission or reception.

Secondly, the voice controlled system capable of automatically controlling the changeover of transmission and reception responsive to talking voice signals makes it possible for the wearer to use his both hands at the time of transmission or reception, but the following disadvantages are caused:

(1) When the receiving speaker is arranged adjacent the microphone, outputs of speaker are received as inputs by the microphone, thus causing such a malfunction that the transmitting circuit is changed open even if no talking voice is present;

(2) When used under highly noisy circumstances over 95 dB, for example, ambient noises are received as inputs by the microphone, thus causing such a malfunction that the transmitting circuit is changed open;

(3) This system uses talking voice sounds of microphone wearer as control signals for the voice controlled device and is arranged to automatically change transmission to reception when no control signal output of talking voice sound is present, so that when the wearer pauses a moment to take a breath or to select words in the course of transmission, transmission is changed to reception because of lack of voice sound and a fear will be caused that the other who is receiving the transmission may misunderstand the temporal and unintended stop of transmission as a true one;

(4) Since transmission is made possible only by the utterance of a voice sound, the first letter of a monosyllable uttered, for example, "K" of "Ka" is cut off and only the vowel "a" is transmitted, thus making obscure contents transmitted; and (5) Even when the transmitting person speaks to not the receiving person but one of neighbouring persons, the automatic controller is also operated to make transmission possible and contents of their speech are heard by the receiving person. Therefore, the microphone wearer (or the transmitting person) must put off the microphone when he wants to speak to not the receiving person but anyone of neighbouring persons.

Thirdly, the improved voice controlled system employs the frequency division manner relative to outputs of speaker and microphone to thereby overcome the disadvantage cited in the above-mentioned item (1). Namely, in the case of this system in which the voice controlled device is operated by bone-conducted voice signals, signal inputs received by the speaker are passed through a high-pass filter, which allows voice signals in the band of 300–5,000 Hz to pass through, to thereby exclude received signals having frequencies lower than a specific frequency (300 Hz) and outputs of microphone (bone-conducted voice signal outputs) are passed through a low-pass filter so as to exclude components having frequencies higher than the specific frequency (300 Hz). Therefore, the voice controlled device is rendered operative only by outputs passed through the low-pass filter, thus enabling the disadvantage cited in the item (1) to be overcome. However, disadvantages cited in items (2)–(5) are left unsolved by this improved voice controlled system because bone-conducted voice signals generated by the speech of microphone wearer are used to control the changeover of transmission and reception in the system.

In the device for transmitting outputs of vibration pick-up microphone, the press talk system for controlling the changeover of transmission stop has the same drawback as described above in the paragraph of this system associated with the changeover of transmission and reception, and voice controlled and improved voice controlled systems also leave unsolved disadvantages cited in items (2)–(5). In these cases the changeover of not transmission and reception but transmission and transmission stop is attained.

In the device for recording outputs of vibration pick-up type microphone, prior arts of controlling the changeover of recording and recording stop also leave unsolved disadvantages cited in items (2)–(5). In these cases the changeover of neither transmission and reception nor transmission and transmission stop but recording and recording stop is attained.

It is therefore an object of the present invention to provide a system for automatically controlling the changeover of transmission and reception and capable of eliminating all of disadvantages cited in items (1)–(5).

Another object of the present invention is to provide a system for automatically controlling the changeover of transmission and transmission stop as well as recording and recording stop, and capable of eliminating all of disadvantages cited in items (2)–(5).

These and other objects as well as merits of the present invention will become apparent from the following detailed description with reference to accompanying drawings.

FIG. 6 is a partially sectioned isometric view showing an embodiment of the system for automatically controlling the changeover of transmission and transmission stop according to the present invention.

FIGS. 7, 8 and 10 are partially sectioned isometric views showing three embodiments of the system for automatically controlling the changeover of transmission and reception according to the present invention.

FIG. 9 is a cross section of an ear-microphone employed in the embodiment shown in FIG. 8.

FIG. 11 is a partially sectioned isometric view of an ear-microphone connected to a behind-ear-case employed in the embodiment shown in FIG. 10.

Figure 1:
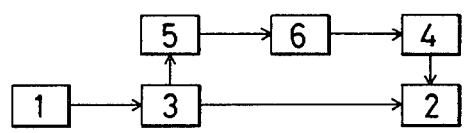
FIG. 1 is a block diagram showing a principle of the system for automatically controlling the changeover of transmission and transmission stop as well as recording and recording stop according to the present invention.
Figure 2:
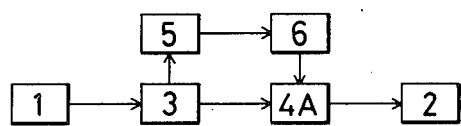
FIGS. 2 and 3 are block diagrams showing other principles of the system of the present invention.

A system of the present invention will be now described to automatically control the changeover of transmission and transmission stop as well as recording and recording stop. FIG. 1 is a diagram showing a principle of system in which a main circuit for achieving transmission or recording is closed and opened responsive to control signals. FIG. 2 is a diagram showing another principle of system in which the main circuit, to which voice signals are applied as inputs, is rendered ON and OFF responsive to control signals.

In Figures numeral 1 represents a vibration pick-up type microphone serving to pick up bone-conducted voice signals transmitted to the external auditory canal, mastoid cells, forehead, throat and the like, and convert voice signals to electrical ones to be applied as outputs. Numeral 2 denotes a main circuit for allowing transmission or recording to be performed after outputs from the microphone 1 are amplified by an amplifier 3, and 4 represents an ON and OFF changeover circuit serving to open and close the main circuit 2 responsive to inputs of control signals. Said main circuit 2, amplifier 3 and changeover circuit 4 are ordinarily included in conventional transmitting or recording devices such as FM radio, wired transmitter or recorder. In FIG. 2 showing another principle of system, numeral 4A represents an ON and OFF changeover circuit (or switch) for allowing voice signals from the microphone 1 to be applied as inputs to the main circuit 2, that is, when the switch 4A is put ON, the main circuit 2 is opened while when OFF, the main circuit 2 is closed.

A feature of the present invention is that impact vibration except voice signals uttered by the microphone wearer and picked up by the microphone 1 through his bones are used as control signals for rendering the main circuit 2 opened and closed. Another feature of the present invention is that according to the order in which control signals are picked up by the microphone 1, for example, according to first and second control signals, the changeover of transmission and transmission stop or recording and recording stop is attained. Therefore, according to the present invention, outputs of microphone 1 are passed through a low-pass or band-pass filter 5 such as a low-pass filter which allows outputs having frequencies, for example, lower than 200 Hz (preferably 130 Hz) to pass through, or a band-pass filter which allows outputs having frequencies, for example, in the band of 50–200 Hz (preferably 80–130 Hz) to pass through, and outputs passed through the filter 5 are applied as inputs to an automatic changeover controller 6, which changes the operation of changeover circuit 4 or 4A.

Figure 3:
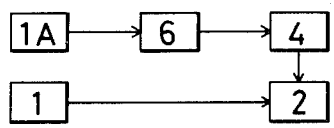

As described above, the low-pass or band-pass filter 5 is used to render the automatic changeover controller 6 operative only by control signals. However, another vibration pick-up type microphone 1A may be used to pick up control signals having frequencies lower than 200 Hz or in the band of 50–200 Hz, and outputs of microphone 1A may be applied as inputs to the automatic changeover controller 6, as shown in FIG. 3. Namely, other feature of the present invention is that the vibration pick-up type microphone 1 or 1A is used as a means for picking up control signals.

Impact vibrations which are employed as control signals in the present invention are generated, for instance, by closing his upper and lower jaws of microphone wearer so as to strike his lower teeth against upper ones. Impact vibrations generated like this are higher in level by about 20 dB as compared with bone-conducted voice signals generated by voice sounds of microphone wearer in the frequency band lower than 200 Hz. Therefore, no fear is caused that bone-conducted voice signals are picked up as control signals to render the automatic changeover controller 6 operative and that vibrations of external auditory canal wall or the like generated by ambient noises are picked up as control signals to render the automatic changeover controller 6 operative because vibrations by ambient noises are lower in level as compared with impact vibrations. Namely, the present invention makes it possible to easily attain this functional effect by using special qualities of filter 5 and vibration pick-up type microphone 1A.

FIG. 6 shows an embodiment of system for automatically controlling the changeover of transmission and reception according to the present invention and having the above-mentioned arrangement.

In the embodiment shown in FIG. 6 an ear-microphone is used as the microphone 1 to pick up bone-conducted voice signals from the external auditory canal wall and a portable wireless transmitter such as FM radio is used as a transmitting device P1. The output terminal of microphone 1 is connected to the microphone input terminal of transmitting device P1 and the output terminal of automatic changeover controller 6 is connected to the switch input terminal of transmitting device P1. This embodies the principle of system shown in FIG. 1.

In more detail, the ear-microphone 1 comprises a microphone body 1a, which is inserted into the external auditory canal of wearer and serves to transmit and receive bone-conducted voice signals contacting with the canal wall, said microphone body 1a being formed cylindrical so as to be easily inserted into the external auditory canal and made of metal such as aluminum or hard plastic material, a vibration pick-up element 1b such as piezoelement for acceleratingly vibrating responsive to the vibration of microphone body 1a and converting bone-conducted voice signals to electrical signals, a support member 1c for supporting the pick-up element, a member 1c' for cutting the peak of voice signals and being made of damper material such as rubber, positive and negative plates 1d and 1e for the pick-up element 1b, and a lead wire 1f. The portable transmitting device P1 includes an amplifier 3, main transmitting circuit 2, changeover circuit 4, power battery 11, antenna 12, power switch 13 and volume adjustor 14, and to the transmitting device P1 is further connected a controlling section C including a filter 5 and controller 6.

The system of the present invention having the above-mentioned arrangement is operated as follows to automatically control the changeover of transmission and transmission stop.

When the power switch 13 is put ON and the microphone wearer strikes "click" his lower teeth against upper ones to generate an impact vibration (which will be hereinafter referred to as the first control signal), the first control signal is picked up by the microphone 1 and applied as an input to the low-pass or band-pass filter 5 through the amplifier 3; the controller 6 is operated by the output sent and selected by the filter 5 and the changeover circuit 4 is put ON to thereby render the main transmitting circuit 2 open. When the microphone wearer utters voice sounds this time, his voice sounds are picked up as bone-conducted voice signals and converted to electric signals by the microphone 1, amplified by the amplifier 3, and transmitted outside through the main transmitting circuit 2.

When the microphone wearer wants to stop the transmission, he may again strike "click" his lower teeth against upper ones to generate another impact vibration (which will be hereinafter referred to as the second control signal). The second control signal serves, like the first control signal, to render the controller 6 operative to automatically return the changeover circuit 4 to OFF state, so that the main transmitting circuit 2 is closed to keep the transmission stopped. Under this state the main transmitting circuit 2 is never opened even if the microphone wearer speaks to anyone of neighboring persons and how noisy the ambient circumstance is. In other words, the controller 6 is not rendered operative until the first or second control signal is applied as an input, and the main transmitting circuit 2 is kept open from the time when the first control signal has been applied to the time when the second cotrol signal is applied.

When the microphone wearer wants to start the transmission again, he may "click" his lower and upper teeth to generate the first control signal.

It is possible that the circuit kept under transmission-possible state at first is then changed to transmission stop state by the input of first control signal.

Though the system of the present invention has been described to automatically control the changeover of transmission and transmission stop, it can be also used to automatically control the changeover of recording and recording stop. In this case a conventional recorder is used instead of transmitting device P1, said recorder having a main circuit 2 for recording outputs of microphone and a changeover circuit 4 for opening and closing the main circuit 2. The changeover of recording and recording stop is automatically controlled by first and second control signals same as impact vibrations employed in the above-mentioned embodiment.

The system of the present invention will be now described to automatically control the changeover of transmission and transmission stop.

Figure 4:
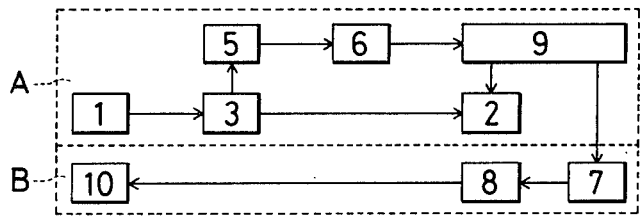
FIGS. 4 and 5 are block diagrams showing two embodiments of the system for automatically controlling the changeover of transmission and reception according to the present invention.
Figure 5:
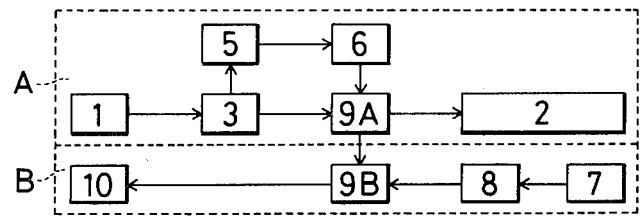

In FIGS. 4 and 5, symbol A represents a transmitting line and numerals 1 through 5 denote same members as those employed in systems shown in FIGS. 1 through 3 and 6 and intended to automatically control the changeover of transmission and transmission stop as well as recording and recording stop. Numeral 6' represents an automatic changeover controller, which performs substantially same operation as that of controller represented by numeral 6 but serves to automatically control the changeover of neither transmission and transmission stop nor recording and recording stop but transmission and reception.

In FIGS. 4 and 5, symbol B represents a receiving line, which is combined with the transmitting line A to form a transmitting and receiving device P2. Numeral 7 denotes a main receiving circuit for receiving signals transmitted from outside, 8 an amplifier for amplifying electrical signal outputs from the main receiving circuit, 9 a changeover circuit, and 10 an air-conducted type speaker (including a sound pressure type earphone) for converting received electrical signals to sound waves or a bone-conducted type speaker for converting received electrical signals to mechanical vibrations to be bone-conducted.

The automatic changeover controller 6' may be arranged to turn ON one of changeover circuits 9A and 9B while the other is kept OFF, as shown in FIG. 5, said changeover circuit 9A serving to put ON and OFF the input of voice signals from the microphone 1 to the main transmitting circuit 2, and said changeover circuit 9B serving to put ON and OFF the output of received signals to the speaker 10 of main receiving circuit 7. This is an embodiment corresponding to the principle of system shown in FIG. 2. As seen in FIG. 3, the vibration pick-up type microphone 1A may be used instead of filter 5 in the receiving line A.

Typical examples of system combining the transmitting line A with the receiving line B are as follows:

(a) A transmitting and receiving device in which the microphone 1 of transmitting line inserted into the external auditory canal of wearer is a vibration pick-up type ear-microphone (which will be hereinafter referred to as ear-mic) for picking up bone-conducted voice signals through the external auditory canal wall, and the ear-mic is housed in the air-conducted type speaker 10, as shown in FIG. 7;

(b) A transmitting and receiving device in which the air-conducted type speaker is housed in or attached to a case attached to a headphone, helmet-like hat (which is represented by numeral 18 in FIG. 7), or frame of spectacles, or a behind-ear case (which is represented by numeral 15 in FIGS. 10 and 11) attached to behind the external ear, and received voice sounds are heard by the ear to which the ear-mic is attached, or by the other ear;

(c) A transmitting and receiving device in which the speaker 10 cited in the above item (b) is a sound pressure type one, and outputs of speaker 10 are introduced into the ear-mic 1 through a sound conducting tube 16 (made of, preferably, elastic material such as rubber and synthetic resin), as shown in FIGS. 10 and 11;

(d) A transmitting and receiving device in which the external ear of wearer to which the ear-mic 1 is attached is covered by an ear-muff, in which the air-conducted or bone conducted type speaker 10 is housed and to which the ear-mic 1 is connected;

(e) A transmitting and receiving device in which the ear-mic 1 and the speaker 10 are attached to a U-shaped band, which is worn on the head of wearer, or both ear-muffs in such a way that the ear-mic 1 is attached to one of ears and the air-conducted or bone-conducted type speaker 10 to the other;

(f) A transmitting and receiving device in which the air-conducted type speaker 10 is housed in a portable wireless transmitting and receiving device and output sounds of speaker 10 are connected through the sound conducting tube 16 to the ear-mic, as shown in FIGS. 8 and 9;

(g) A transmitting and receiving device in which the microphone of transmitting line is not ear-mic but of vibration pick-up type and fixedly attached by means of an attachment band and the like to mastoid cells, forehead or throat, and the speaker attached to the external ear is a sound pressure type earphone.

In FIGS. 9 and 11, numeral 17 represents a sound conducting passage.

The system of the present invention having one of above-mentioned arrangements is operated as follows to automatically control the changeover of transmission and reception.

When the transmitting and receiving person (or ear-mic wearer) clicks his lower and upper teeth to generate the impact vibration (or first control signal), the first control signal is picked up by the microphone 1; the output of microphone 1 is amplified by the amplifier 3, selected by the low-pass or band-pass filter 5, and applied as an input to the controller 6; so that the controller 6 is rendered operative to cause the changeover circuit 9 to automatically change reception to transmission. When the wearer utters voice sounds this time, bone-conducted voice signals generated by his voice sounds are picked up by the microphone 1 and transmitted outside in wireless or wired manner through the amplifier 3 and the main transmitting circuit 2. The speaker 10 is kept not to generate outputs during this period, since the main receiving circuit 7 is held under closed state.

When the wearer wants to perform reception, he may again click his lower and upper teeth to generate another impact vibration (or second control signal). This second control signal is applied as input to the microphone 1 in same way as the first control signal was; the output of microphone 1 is applied through the amplifier 3 to the filter 5; and the output of filter 5 is applied to the controller 6'; so that the changeover circuit 9 is caused by the output of controller 6' to automatically change transmission to reception. The changeover circuit 9 is kept unchanged under this state even if the wearer speaks to anyone of neighboring persons or how noisy the ambient circumstance is.

As the circuit 9, 9A or 9B employed in the present invention to automatically control the changeover of transmission and reception, are used a semi-conductor relay switch circuit and the like comprising combining a transistor changeover circuit, mechanical relay switch and transistor, and both of main transmitting and receiving circuits 2 and 7 are never caused to open or close at the same time.

It is also possible in the present invention that, usually kept under transmitting state, the circuit is changed to receiving state by the first control signal.

As the automatic changeover controller 6 or 6' used in the present invention, may be employed a semi-conductor (LM 170 type, LM 270 type, LM 370 type made by, for example, National Semiconductor Company) combined with a flip-flop circuit, said semiconductor being well known to be used in radio, audio device and television circuit.

The microphone wearer knows whether the device is under transmission or transmission stop, or recording or recording stop, or transmission or reception by meters attached to the conventional transmitter, recorder or transmitting and receiving device. However, it is also possible for the wearer to know these states by lamps or the like.

The automatic control system of the present invention having the above-mentioned arrangement and function to automatically control the changeover of transmission and transmission stop or recording and recording stop is capable of eliminating above-mentioned disadvantages (2)–(5) unavoidable in the case of conventional voice controlled systems. In addition, even if it is used under highly noisy circumstances of over 95 dB in level, its main transmitting or recording circuit is not switched over to opened or closed state until one of control signals, or impact vibrations, is applied as input to the circuit, to thereby prevent malfunction. Therefore, the system of the present invention is most effective when used under highly noisy circumstances with both hands of wearer occupied with a hand-work.

Further, the automatic control system of the present invention having the above-mentioned arrangement and function to automatically control the changeover of transmission and reception is capable of eliminating all of disadvantages (1)–(5) unavoidable in the case of conventional voice controlled systems, and most effective, like the automatic transmission or recording control system, when used under highly noisy circumstances with both hands of wearer occupied with a hand-work.

What is claimed is:

1. An automatic transmission system employed in a transmitter having a vibration pick-up type ear-insert microphone adapted to be employed in the external auditory canal of a user for picking up bone-conducted signals wherein tooth clicks of the user transmitted through the bones of the user and picked up by said microphone are used as control signals, and means for controlling the changeover of starting and stopping transmission sequentially in response to receipt of said control signals.

2. A system according to claim 1 wherein a second vibration pick-up type microphone is provided to pick up voice signals, said means controlling the changeover comprising means controlling transmission of said voice signals in response to said control signals.

3. A system according to claim 1 comprising means for producing first and second signals with changeover of transmission and transmission stop alternately attained according to the input order in which first and second control signals are applied.

4. A system according to claim 3 comprising means for producing at least three control signals.

5. A system according to claim 1 wherein closed and opened states of circuit which is controlled by control signals are displayed by visible display means.

6. An automatic recording control system employed in a recorder having a vibration pick-up microphone insertable in the external auditory canal of a user for picking up bone-conducted voice signals wherein tooth clicks of the user, transmitted through bones are picked up by the microphone means are provided for producing control signals from said tooth clicks, and means responsive to said control signals for the changeover of recording and end of recording stop according to the input order in which control signals are applied.

7. A system according to claim 6 comprising means for producing first and second signals with changeover of recording and end of recording alternately attained according to the input order in which first and second control signals are applied.

8. A system according to claim 7 wherein re-winding of recording tape is achieved by a third control signal and reproduction of recording is attained by a fourth control signal.

9. In an automatic voice transmission system having a changeover control means for controlling the passage and blocking of voice signals, and means providing control signals for controlling said changeover control means; the improvement wherein said means providing control signals comprises a vibration type microphone adapted to be inserted in the external auditory canal of a user for picking up bone-conducted signals, and filter means passing only signals less than 200 Hz for deriving said control signals from the output of said microphone.

10. The system of claim 9 wherein said filter means passes only signals less than 130 Hz.

11. The system of claim 9 wherein said changeover control means alternately passes and blocks said voice signals in response to sequential control signals.

12. The system of claim 9 wherein means are provided for passing voice signals from said microphone to said changeover control means for the passage and blocking thereof.

13. The system of claim 9 wherein voice signals for passage and blocking by said changeover means are derived in a separate microphone.

* * * * *